(12) United States Patent
Hobson et al.

(10) Patent No.: US 7,538,169 B2
(45) Date of Patent: May 26, 2009

(54) ION CONDUCTIVE FILM AND FUEL CELL USING THE SAME

(75) Inventors: Lois Hobson, Tokyo (JP); Shuji Hayase, Yokohama (JP); Yoshihiko Nakano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 649 days.

(21) Appl. No.: 11/186,948

(22) Filed: Jul. 22, 2005

(65) Prior Publication Data

US 2005/0256213 A1    Nov. 17, 2005

Related U.S. Application Data

(62) Division of application No. 09/949,120, filed on Sep. 10, 2001, now Pat. No. 6,936,365.

(30) Foreign Application Priority Data

Sep. 29, 2000    (JP) .............................. 2000-301383

(51) Int. Cl.
*C08F 12/20*    (2006.01)
*C08F 12/30*    (2006.01)

(52) U.S. Cl. .................... 526/243; 526/245; 429/30; 429/33

(58) Field of Classification Search ................ 526/243, 526/245; 429/30, 33
See application file for complete search history.

(56) References Cited

U.S. PATENT DOCUMENTS

| | | | |
|---|---|---|---|
| 4,988,582 A | 1/1991 | Dyer | |
| 5,837,125 A | 11/1998 | Prasad et al. | |
| 6,010,798 A | 1/2000 | Hammerschmidt et al. | |
| 6,264,857 B1 * | 7/2001 | Kreuer et al. | 252/500 |
| 6,288,187 B1 | 9/2001 | Armand | |
| 6,465,120 B1 | 10/2002 | Akita et al. | |
| 2002/0061432 A1 | 5/2002 | Nakano et al. | |
| 2005/0089741 A1 * | 4/2005 | Nakano et al. | 429/33 |

FOREIGN PATENT DOCUMENTS

| | | |
|---|---|---|
| JP | 6-342665 | 12/1994 |
| JP | 2000-517462 | 12/2000 |
| JP | 2002-110200 | 4/2002 |
| WO | 98/07164 | 2/1998 |
| WO | WO 98/07164 * | 2/1998 |

OTHER PUBLICATIONS

Kreuer, K.D., et al., "Imidazole and pyrazole-based proton conducting polymers and liquids", Electrochimica Acta, vol. 43, Nos. 10-11, 1998, pp. 1281-1288.

Deluga, G., et al., "Composite Membranes in Liquid Feed Direct Methanol Fuel Cells", Proceedings of the 3rd International Symposium on New Materials for Electrochemical Systems, Montreal, Canada, 1999, Ed. O. Savadogo, pp. 132.135.

Jia, N., et al., "Modification of Nafion Proton Exchange Membranes to Reduce Methanol Crossover in PEM Fuel Cells", Electrochemical and Solid-State Letters, 3 (12), 2000, pp. 529-531.

Tricoli, V., "Proton and Methanol Transport in Poly(perfluorosulfonate) Membrances Containing Cs+ and H+ Cations", J. Electrochem. Soc., vol. 145, Nos. 11, Nov. 1998, pp. 3798-3801.

"Comprehensive Organic Chemistry, The Synthesis and Reactions of Organic Compounds", vol. 4, Pergamon Press, pp. 357-367.

Ohwada, T., et al., "Nitroethylene Yields, N,N-Dihydroxyminium—Methylium Dication in Trifluoromethanesulfonic Acid. Dications Stabilized by Y Delocalization", J. Am. Chem. Soc., vol. 109, No. 23, 1987, pp. 7036-7041.

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

Disclosed is an ion conductive film containing a composite body between an ion conductive polymer and a nitrogen-containing compound. The nitrogen-containing compound has an immobilized portion to the ion conductive polymer and exhibits an enantiomeric isomer structure when protonated. Alternatively, the nitrogen-containing compound is capable of assuming a chemical structure in which the multiple bond represented by the double bound is moved, with the atoms constituting the molecule not changing their positions.

18 Claims, 1 Drawing Sheet

ION CONDUCTIVE FILM AND FUEL CELL USING THE SAME

CROSS-REFERENCE TO RELATED APPLICATIONS

This application is based upon and claims the benefit of priority from the prior Japanese Patent Application No. 2000-301383, filed Sep. 29, 2000, the entire contents of which are incorporated herein by reference.

BACKGROUND OF THE INVENTION

1. Field of the Invention

The present invention relates to an ion conductive film and a fuel cell using the same.

2. Description of the Related Art

The conventional methanol fuel cell can be classified according to the method of supplying the liquid fuel: a liquid supply type and a gasified fuel supply type. In the fuel cell of the gasified fuel supply type, the electrode reaction is carried out between the electrode and the gasified fuel. As a result, it is possible to obtain a high performance with a high reactivity. On the other hand, the system is highly complex, making it difficult to be miniaturized.

When it comes to the fuel cell of a liquid supply type, the system is rendered relatively simple, compared with the gasified fuel supply type. However, since the electrode reaction is takes place between the electrode and the liquid fuel, the reactivity is low, leading to the problem of low performance. The liquid fuel cell utilizes the capillary action for the supply of fuel, in a liquid state, to the fuel electrode and, thus, does not require a pump or the like. Therefore, the liquid fuel cell of this type can be miniaturized. However, the electrode reaction is weak and, thus, is low in performance.

In addition to the problems described above, the greatest problem inherent in the fuel cell is that, where a proton conductive solid polymer film, such as a film of perfluorosulfonic acid available under the trade name "Nafion" from Du Pont Inc., USA, is used as an electrolytic membrane, generated is a cross-over problem caused by the permeation of an organic liquid fuel, such as methanol, through the electrolytic membrane, reaches the electrode of the oxidizing agent. Where this "cross-over" phenomenon has taken place, the supplied liquid fuel reacts directly with the oxidizing agent, resulting in failure to output the energy as the electric power. It follows that a decisive problem is generated that it is impossible to obtain a stable output.

BRIEF SUMMARY OF THE INVENTION

As described above, in the conventional fuel cell, the ion conductive solid polymer film was incapable of sufficiently suppressing the cross-over of methanol, resulting in a failure to supply a stable output.

The present invention, which has been achieved in view of the situation described above, is intended to provide an ion conductive film capable of suppressing the cross-over of methanol, while maintaining ion conductivity.

The present invention is also intended to provide a fuel cell capable of supplying a stable output.

According to one aspect of the present invention, there is provided an ion conductive film having a composite body, the composite body comprising:

an ion conductive polymer; and a nitrogen-containing compound, having an immobilized portion to the ion conductive polymer, and exhibiting an enantiomeric isomer structure when protonated.

According to another aspect of the present invention, there is provided an ion conductive film having a composite body, the composite body comprising:

an ion conductive polymer; and a nitrogen-containing compound capable of assuming a chemical structure in which the multiple bond is moved, with the atoms constituting the molecule not changing their positions.

According to another aspect of the present invention, there is provided a fuel cell, comprising:

an electrolytic membrane containing an ion conductive film having a composite body between an ion conductive polymer and a nitrogen-containing compound, the nitrogen-containing compound having an immobilized portion to the ion conductive polymer and exhibiting an enantiomeric isomer structure when protonated; and a fuel electrode and an oxidizing agent electrode having the electrolytic membrane sandwiched therebetween.

Further, according to another aspect of the present invention, there is provided a fuel cell, comprising:

an electrolytic membrane containing an ion conductive film having a composite body between an ion conductive polymer and a nitrogen-containing compound, the nitrogen-containing compound being capable of assuming a chemical structure in which the multiple bond is moved, with the atoms constituting the molecule not changing their positions; and a fuel electrode and an oxidizing agent electrode having the electrolytic membrane sandwiched therebetween.

DETAILED DESCRIPTION OF THE INVENTION

Figure 1:
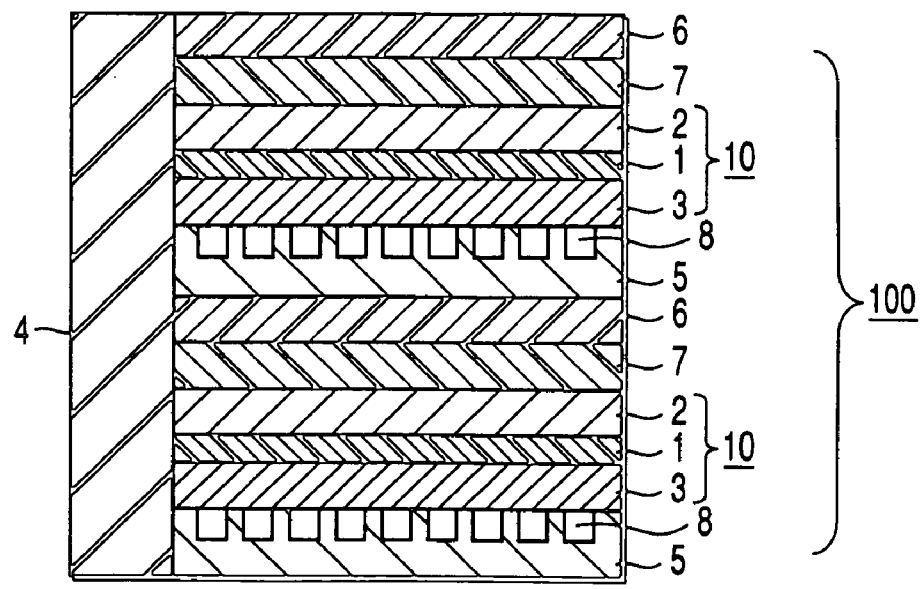
FIG. 1 schematically shows as an example of the construction of a methanol fuel cell according to one embodiment of the present invention.

The present invention will now be described in detail.

An ion conductive film having the fluorine-containing resin represented by Nafion as the basic skeletal structure exhibits an excellent ionic conductivity. The high ionic conductivity is exhibited through the cluster network of a water containing state. Therefore, in a fuel cell using methanol, a problem is generated in that methanol released from the anode is mixed with water, which passes through the cluster network. As a result, methanol is diffused into the cathode, thereby lowering the output voltage. For overcoming the problem, a crosslinked structure or the like is adopted throughout the ion conductive film so as to suppress the swelling of the ion conductive film. Where the entire film is crosslinked, however, a new problem is generated in that the conductivity is markedly lowered.

The present inventors have found, as a result of extensive research, that the permeation selectivity of water and methanol can be enhanced while maintaining a high ion conductivity of the ion conductive film, by forming a composite material between the nitrogen-containing compound having an enantiomeric isomer structure and the film, which is excellent in ion conductivity but low in methanol permeability, which lead to the present invention.

In the ion conductive film according to one embodiment of the present invention, it is possible for the ion conductive polymer to be provided by, for example, a polystyrene-sulfonic acid copolymer, a polyvinyl-sulfonic acid copolymer, a crosslinked alkyl sulfonic acid derivative, a fluorine-containing polymer having a fluorine-containing resin skeleton and a sulfonic group, and a fluorine-containing polymer having a fluorine-containing resin skeleton and a carboxylic group. Particularly, it is most desirable for the ion conductive polymer to be provided by a polymer having at least one of a sulfonic group and a carboxylic group and a fluorine-containing resin skeleton, in view of durability, film strength and ionic conductivity.

The ion conductive polymer described above can have a thickness between 10 µm and 500 µm. However, it is desirable for the ion conductive polymer film to have a thickness falling within a range of between 50 µm and 200 µm in view of the balance of mechanical strength and electric conductivity.

The ion conductive film according to one embodiment of the present invention is formed of a composite body comprising the ion conductive polymer described above and a specified nitrogen-containing compound having a molecular weight not higher than 1000.

The nitrogen-containing compound used in the present invention is required to have an immobilized portion to the ion conductive polymer and an enantiomeric isomer structure when protonated. Incidentally, the nitrogen-containing compound having an enantiomeric isomer structure when protonated represents a nitrogen compound capable of assuming a chemical structure in which the multiple bonds represented by a double bond is moved, with the atoms constituting the molecule not changing their positions. To be more specific, the particular nitrogen-containing compound used in the present invention includes, for example, imidazole, guanidine, triazole and derivatives thereof.

Incidentally, two systems are known to the art as the proton moving type relating to the proton conductivity. In general, protons are transferred under a hydrated state together with the migration of water. If the proton conductance within the electrolytic membrane of a fuel cell is generated in such a mechanism, methanol is also transferred together with water, resulting in the cross-over of methanol. The Grottus mechanism is known to the art as the proton conductivity mechanism in which water is not involved. The Grottus mechanism represents the proton moving method in which the proton is seemingly moved while jumping over the methanol molecules. In the Grottus mechanism, water is not involved in the proton migration, making is possible to realize the selective migration of the proton. It is known to the art that the Grottus mechanism can be realized by using a part of the hydrogen bondable enantiomeric isomer. However, it was previously impossible to ensure a proton conductivity sufficient for practical level, using the Grottus mechanism.

The present inventors have found that, where a composite body is formed by a nitrogen-containing compound having a portion bonded to the ion conductive polymer and also having a nitrogen-containing enantiotopic isomer structure and an ion conductive film, it is possible to ensure a practical proton conductivity and to lower the methanol permeability. It is possible for the coupling portion of the nitrogen-containing compound with the ion conductive polymer to be any of a hydrogen bond, a ionic bond and a covalent bond. Particularly, the nitrogen-containing compound used in the present invention includes, for example, imidazole, triazole, guanidine and derivatives thereof. To be more specific, the nitrogen-containing compound used in the present invention includes, for example, guanidino benzimidazole, guanine, guanidine carbonate, purine, diamino purine, diamino triazole, histamine, and salts thereof. Particularly, guanidine carbonate exhibits excellent characteristics when a composite body is formed together with a fluorine-containing sulfonic acid.

Incidentally, the "composite body" referred to in the present specification represents the state in which the ion conductive polymer and a specified nitrogen-containing compound are bonded to each other by an ionic bond. To be more specific, a composite body according to one embodiment of the present invention can be formed by the mutual function with a carboxylic acid or with a carbocation serving to achieve the coupling between a carboxylic acid and nitrogen. It is desirable for the molecular weight of the nitrogen-containing compound to be not higher than 1000 because, if the molecular weight of the nitrogen-containing compound exceeds 1000, it is difficult for the nitrogen-containing compound to form a composite body together with the ion conductive polymer.

Where a fluorine-containing sulfonic acid constitutes the ion conductive polymer in the composite body described above, it is desirable for the nitrogen-containing compound to be contained in an amount of about 1 to 50,000 ppm of the fluorine-containing sulfonic acid. Where the amount of the nitrogen-containing compound is smaller than 1 ppm, it is difficult to obtain the effect of suppressing the methanol permeation. On the other hand, where the amount of the nitrogen-containing compound exceeds 50,000 ppm, the proton conductivity tends to be lowered. It is more desirable for the amount of the nitrogen-containing compound to fall within a range of between 10 ppm and 10,000 ppm of the fluorine-containing sulfonic acid.

In the ion conductive film according to one embodiment of the present invention, the nitrogen-containing compound produces its effect in each of the cases where the nitrogen-containing compound is coated on the surface and impregnated in the ion conductive film. Where the nitrogen-containing compound is coated on the surface of the ion conductive film, it is desirable for the ion conductive film to be thin because the decrease in the electric conductivity of the film is lowered. The ion conductive film, which is generally 0.01 to 10 µm thick, should desirably be 0.1 to 1 µm thick. Also, it is possible for the nitrogen-containing compound to be coated on one surface of the ion conductive film or to be sandwiched between two ion conductive films.

A film containing a nitrogen-containing compound can be obtained by, for example, preparing a solution by dissolving a nitrogen-containing compound and another soluble ion conductive substance in a suitable solvent, followed by coating a film of an ion conductive polymer with the resultant solution. The solvent used for preparing the solution includes, for example, water, alcohol, ether and ester. Also, the "another ion conductive substance" noted above includes, for example, a carbonate, a hydrochloride and a sulfate.

It is also possible to prepare an ion conductive film according to one embodiment of the present invention by a laminating method or an immersion method in addition to the coating method. In this case, it is possible to apply a pressing or heat treatment. Where the ion conductive film is prepared by the immersion method, it is desirable for the concentration of the nitrogen-containing compound in the solution used to be low. To be more specific, a better effect can be obtained by the treatment with a low concentration not higher than 0.1%.

It is possible to increase the electric conductivity of the film by doping the ion conductive film in the form of the composite body described above with an organic acid or an inorganic acid such as perfluoromethane sulfonic acid, perfluoro acetic acid, phosphoric acid or nitric acid. The concentration of the doped organic acid or inorganic acid can be determined appropriately depending on the ratio of the conductivity to the methanol permeability used.

It is possible to promote the crosslinkage of the ion conductive film according to one embodiment of the present invention, which contains a composite body between an ion conductive polymer and a nitrogen-containing compound, by irradiation with an energy beam such as an electron beam (EB), gamma rays, ultraviolet light or by the heating with a microwave or with a heater so as to suppress the swelling of the ion conductive film. In general, an EB reaches a deep portion of the film and, thus, where the ion conductive film is irradiated with an EB, it is desirable to set the accelerating voltage at 100 kV or less. Where the accelerating voltage exceeds 100 kV, the damage done to the film is excessively large or the EB reaches a deep portion of the film, with the result that it is difficult to obtain a desired film. In order to obtain a sufficient effect, it is desirable for the accelerating voltage to be 20 kV or more. The particular treatment can be performed either within an inert gas atmosphere or within air, though reproducible effect can be obtained when EB irradiation is carried out under an inert gas atmosphere.

The methanol fuel cell according to one embodiment of the present invention will now be described with reference to the accompanying drawings.

FIG. 1 schematically shows the construction of a fuel cell according to one embodiment of the present invention. Incidentally, FIG. 1 simply shows a stacked body 100 and a liquid fuel introduction path 4. It should be noted in this connection that a liquid fuel is introduced from a fuel tank (not shown) into the liquid fuel introduction path 4 via an introducing pipe (not shown).

As shown in FIG. 1, the stacked body 100 is prepared by stacking a plurality of unit cells one upon the other. In each unit cell, an electrolyte plate 1 is held between a fuel electrode (anode) 2 and an oxidizing agent electrode (cathode) 3. An electromotive section 10 is formed by the electrolyte plate 1, the fuel electrode 2 and the oxidizing agent electrode 3. Each of the fuel electrode 2 and the oxidizing agent electrode 3 is formed of a conductive porous body such that the fuel and the oxidizing agent gas as well as electrons can be circulated therethrough.

Further, each unit cell includes a fuel permeating section 6 capable of performing the function of holding the liquid fuel and a fuel evaporating section 7 for guiding the evaporated fuel evaporated from the liquid fuel held by the fuel permeating section 6 to the fuel electrode 2. The fuel evaporating section 7 is arranged between the fuel Dermeating section 6 and the fuel electrode 2. A plurality of unit cells each including the fuel permeating section 6, the fuel evaporating section 7 and the electromotive section 10 are stacked one upon the other with a separator 5 interposed therebetween so as to form the stacked type fuel cell 100. It should be noted that an oxidizing agent gas supply groove 8 is formed as a continuous groove on that surface of the separator 5 which faces the oxidizing agent electrode 3.

Incidentally, as a means for supplying a liquid fuel from the fuel tank into the fuel permeating section 6 of the unit cell, it is conceivable to form the liquid fuel introduction path 4 joined to the fuel tank on at least one side surface of the stacked fuel cell 100. The liquid fuel introduced into the liquid fuel introduction path 4 is supplied through the side surface of the stacked fuel cell 100 to the fuel permeating section 6 and, then, evaporated in the fuel evaporating section 7. Further, the evaporated fuel is supplied to the fuel electrode 2. It should be noted that, where the fuel permeating section 6 is formed of a material producing a capillary action, it is possible to supply the liquid fuel to the fuel permeating section 6 by capillary action without using auxiliary equipment. For capillary action to be effective, it is necessary for the fuel cell to be constructed such that the liquid fuel introduced into the liquid fuel introduction path 4 is in direct contact with one end of the fuel permeating section 6. It is also necessary for the region between the liquid fuel introduction path 4 and the stacked fuel cell 100 to be insulated, except for the region to which the fuel permeating section 6 is connected, though the insulation is omitted in FIG. 1.

Where the stacked fuel cell 100 is prepared by stacking a plurality of unit cells one upon the other as shown in FIG. 1, the separator 5, the fuel permeating section 6 and the fuel evaporating section 7 also perform the function of a collecting plate for conducting the generated electrons and, thus, are formed of a conductive material such as a porous body containing carbon. Further, a stratum-like, an island-like or granular catalyst layer is formed as required between the fuel electrode 2 and the electrolyte plate 1 and between the oxidizing agent electrode 3 and the electrolyte plate 1.

It is also possible for the fuel electrode 2 itself and the oxidizing agent electrode 3 itself to perform the function of a catalyst electrode. It is possible for the catalyst electrode to be of a single-layered structure comprising a catalyst layer alone or of a multi-layered structure comprising a substrate such as a conductive paper or cloth and a catalyst layer formed on the substrate.

As described above, the separator 5 included in the unit cell shown in FIG. 1 also performs the function of a channel allowing the flow of the oxidizing agent gas. By using the separator 5 performing the functions of both the separator and the channel, i.e., a channeling-separator 5, the number of parts used can be decreased so as to further miniaturize the fuel cell. It is also possible to use an ordinary channel in place of the particular separator 5.

For supplying a liquid fuel from the fuel storing tank (not shown) into the liquid fuel introduction path 4, the liquid fuel housed in the fuel storing tank is subjected to, for example, free fall so as to be introduced into the liquid fuel introduction path 4. This method permits introducing the liquid fuel into the liquid fuel introduction path 4 without fail, though there is a structural limitation in that the fuel storing tank must be positioned higher than the upper surface of the stacked fuel cell 100. It is also possible that the liquid fuel is sucked from the fuel storing tank by the capillary action of the liquid fuel introduction path 4. In the case of employing this method, it is unnecessary to make the connection between the fuel storing tank and the liquid fuel introduction path 4, i.e., the position of the fuel inlet port formed in the liquid fuel introduction path 4, higher than the upper surface of the stacked fuel cell 100. It follows that, if this method is combined with, for example, the free fall method, it is possible to obtain a merit that the installing position of the fuel tank can be set freely.

It should be noted, however, that, in order to smoothly supply the liquid fuel, which is introduced into the liquid fuel introduction path 4 by capillary action, into the fuel permeating portion 6 by capillary action, it is desirable for the force of the capillary action produced by the fuel permeating section 6 to be set greater than the force of the capillary action produced in the liquid fuel introduction path 4. Incidentally, in the embodiment shown in the drawing, only one liquid fuel introduction path 4 is arranged along the side surface of the stacked fuel cell 100. However, it is also possible to form another liquid fuel introduction path 4 along the other side surface of the stacked fuel cell 100.

The fuel storing tank described above can be made detachable from the stacked fuel cell 100. As a result, the cell can be operated for a long time by replacing the fuel storing tank. Also, the liquid fuel can be supplied from the fuel storing tank into the liquid fuel introduction path 4 by utilizing free fall as described above, by pressing the tank so as to expel the liquid fuel, or by drawing the fuel out by capillary action via the liquid fuel introduction path 4.

As described above, the liquid fuel introduced into the liquid fuel introduction path 4 is supplied into the fuel permeating section 6. The type of fuel permeating section 6 is not particularly limited as long as it is capable of holding the liquid fuel inside the fuel permeating section 6 and is capable of supplying the evaporated fuel alone into the fuel electrode 2 though the fuel evaporating section 7. For example, it is possible for the fuel permeating section 6 to include a gas-liquid separating membrane, which acts as a liquid fuel passageway, at the interface with the fuel evaporating section 7. Further, where a liquid fuel is supplied to the fuel permeating section 6 by the force of the capillary action, the type of fuel permeating section 6 is not particularly limited as long as the liquid fuel is capable of passing through the fuel permeating section 6 by capillary action. For example, it is possible for the fuel permeating section 6 to be formed of a porous body comprising particles or a filler, a unwoven fabric prepared by the paper-making method, a woven fabric prepared by weaving fibers, and small clearances formed between the fuel permeating section 6 and a plate made of glass or a plastic material.

In the case where a porous body is used for forming the fuel permeating section 6, the capillary action of the porous body itself forming the fuel permeating section 6 can be utilized as the force of the capillary action for sucking the liquid fuel into the fuel permeating section 6. In the case of utilizing the capillary action, prepared is an open cell structure in which pores of the fuel permeating section 6 made of a porous body are continuous and the pore diameter is controlled. It should be noted that the open cell is allowed to extend from the side surface of the fuel permeating section 6 of the liquid fuel introduction path 4 to reach at least the other surface, with the result that the liquid fuel can be smoothly supplied in the lateral direction by the capillary action.

The pore diameter of the porous body used for forming the fuel permeating section 6 is not particularly limited, as far as the fuel permeating section 6 is capable of sucking the liquid fuel from within the liquid fuel introduction path 4. However, it is desirable for the pore diameter to fall within a range of between about 0.01 µm and 150 µm in view of the force of the capillary action of the liquid fuel introduction path 4. It is also desirable for the area ratio of the pores, which provides the index of the pore continuity within the porous body, to fall within a range of between about 20% and 90%. If the pore diameter is smaller than 0.01 µm, it is difficult to manufacture the fuel permeating section 6. On the other hand, if the pore diameter exceeds 150 µm, the capillary action tends to be weakened. Also, if the area ratio of the pore is less than 20%, the amount of the open cell is decreased, with the amount of the closed cell increased, resulting in a failure to obtain a sufficient capillary action. On the other hand, if the area ratio of the pore exceeds 90%, the amount of the open cell is certainly increased. However, the mechanical strength of the fuel permeating section 6 is lowered so as to make it difficult to manufacture the fuel permeating section 6. In practice, it is desirable for the pore diameter to fall within a range of between 0.5 µm and 100 µm and for the pore area ratio to fall within a range of between 30% and 75%.

The present invention will now be described in more in detail with reference to Examples. Needless to say, the technical scope of the present invention is not limited by the Examples which follow.

Ion conductive films for Examples 1 to 5 were prepared by combining ion exchange resin films (Nafion films) and process solutions containing predetermined concentrations of nitrogen-containing compounds, as shown in Table 1 below.

In preparing the ion conductive film, each of the ion conductive resin films was dipped in the process solution for one hour at 100° C., followed by washing at room temperature and subsequently pressing the washed ion exchange resin film.

Figure 2:
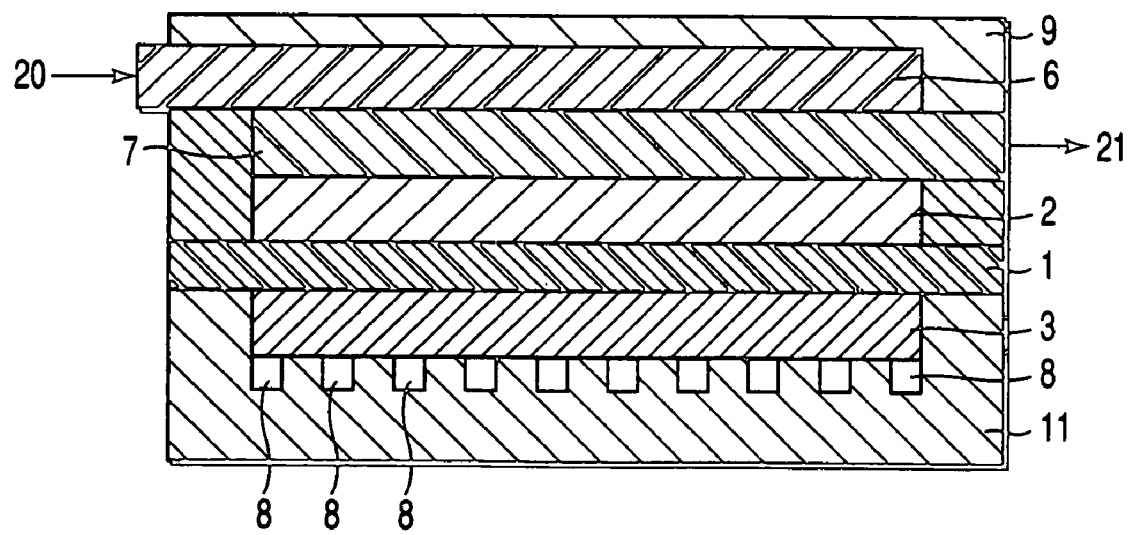
FIG. 2 schematically shows the construction of a liquid fuel cell manufactured according to the Example of the present invention.

Then, the unit cell constructed as shown in FIG. 2 was prepared as follows by using the resultant ion conductive film as the electrolyte film 1. In the first step, prepared were the fuel electrode 2 sized at 32 mm×32 mm and formed of a Pt—Ru series catalyst layer formed on a carbon cloth and the oxidizing agent electrode 3 sized at 32 mm—32 mm and formed of a Pt black catalyst layer formed on a carbon cloth. The ion conductive film forming the electrolyte membrane 1 was held between the fuel electrode 2 and the oxidizing agent electrode 3 such that the catalyst layers were in direct contact with the ion conductive film, to obtain a laminate structure. The laminate structure thus obtained was subjected to a hot pressing at 120° C. for 5 minutes under a pressure of 100 kg/cm$^2$ so as to obtain the electromotive section 10.

Further, the unit cell constructed as shown in FIG. 2 was prepared by incorporating the electromotive section 10 thus obtained in the system including the fuel evaporating section 7 comprising a porous carbon plate having an average pore diameter of 100 µm and a porosity of 70%, the fuel permeating section 6 comprising a carbon porous plate having an average pore diameter of 5 µm and a porosity of 40%, an oxidizing agent electrode holder 11, and a fuel electrode holder 9. The reaction area of the unit cell thus prepared was 10 cm$^2$. Incidentally, the oxidizing agent electrode holder 11 was provided with an oxidizing agent gas supply groove 8 having a depth of 2 mm and a width of 1 mm.

As shown in FIG. 2, a liquid fuel 20 is introduced into the fuel permeating section 6 and, after the electrode reaction, a $CO_2$ gas 21 is released from the fuel evaporating section 7.

A mixture of methanol and water mixed at 1:1 molar ratio was introduced as the liquid fuel 20 into the liquid fuel cell thus obtained by utilizing the capillary action from the side surface of the fuel permeating section 6. At the same time, the air of 1 atm. used as the oxidizing agent gas was allowed to flow through the gas channel 8 at the rate of 100 ml/min so as to achieve electric power generation.

Further, an additional unit cell was also prepared as above, except that an unprocessed Nafion film was used as the electrolyte membrane, so as to provide a Comparative Example.

Table 1 shows the conductivity and the relative methanol permeability of each ion conductive film and the fuel cell characteristics together with the ion exchange resin film and the process solution used. The methanol permeability is indicated as a relative value with the methanol conductivity of the unprocessed Nafion film (Comparative Example 1) set at 1.

TABLE 1

| | Ion exchange resin | Nitrogen-containing compound | Methanol permeation amount Relative value with Nafion 117 set at 1 | Resistance of cell (mΩ) | Maximum power generation in the case of using 20% aqueous methanol solution (mW/cm$^2$) |
|---|---|---|---|---|---|
| Example 1 | Nafion 117 | Guanidium carbonate (0.01% aqueous solution) | 0.5 | 30 | 20 |
| Example 2 | Nafion 1135 | Guanidium carbonate (0.03% aqueous solution) | 0.3 | 30 | 25 |
| Example 3 | Nafion 115 | Guanidium carbonate (0.02% aqueous solution) | 0.3 | 35 | 20 |
| Example 4 | Nafion 117 | Guanidino benzimidazole (treated with 0.01% aqueous solution) | 0.5 | 40 | 17 |
| Example 5 | Nafion 117 | Diamino purine (0.01% aqueous solution) | 0.5 | 40 | 16 |
| Comparative Example 1 | Nafion 117 | None | 1 | 30 | 2 |

As is apparent from Table 1, the ion conductive films of Examples 1 to 5, which was substantially equal in electrical conductivity to the unprocessed Nafion film (Comparative Example 1), was found to exhibit the methanol permeability markedly lower than that for Comparative Example 1.

In the fuel cell prepared by using the unprocessed Nafion film 117 as the electrolyte membrane, the cross-over was excessively large in the case of using a 20% methanol solution, as is apparent from Comparative Example 1, with the result that the maximum power generation was only 2 mW/cm$^2$. On the other hand, when it comes to the unit cell using the ion conductive film containing the composite body of Examples 1 to 5 of the present invention, the cross-over was suppressed, leading to satisfactory power generation. This indicates that the composite film in the Examples of the present invention permits a more effective lowering of the methanol permeability while maintaining the electrical conductivity inherent in the Nafion film.

As described above in detail, the present invention provides an ion conductive film, which permits suppressing the cross-over of methanol while maintaining the ion conductivity.

The present invention also provides a fuel cell capable of producing a stable output.

The present invention makes it possible to provide a fuel cell small in size, high in performance, and capable of supplying a stable output and, thus, has a markedly high industrial value.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ion conductive film having a composite body, said composite body comprising:
   an ion conductive polymer; and
   a nitrogen-containing compound, having an immobilized portion to said ion conductive polymer,
   wherein the nitrogen-containing compound is selected from the group consisting of guanine, a salt of guanine, guanidine, a salt of guanidine, guanidinobenzimidazole, a salt of guanidobenzimidazole, purine, a salt of purine, diaminopurine, a salt of diaminopurine, diaminotriazole, a salt of diaminotriazole, histamine, a salt of histamine, and combinations thereof.

2. The ion conductive film according to claim , wherein said ion conductive polymer is a polymer containing at least one of a sulfonic group and a carboxyl group and a fluorine-containing resin skeleton.

3. The ion conductive film according to claim 1, wherein said nitrogen-containing compound is the salt of guanidine, and wherein the salt of guanidine is guanidium carbonate.

4. The ion conductive film according to claim 1, wherein the molecular weight of said nitrogen-containing compound is not higher than 1000.

5. The ion conductive film according to claim 1, wherein said ion conductive polymer is a fluorine-containing sulfonic acid and the amount of said nitrogen-containing compound falls within a range of between 1 ppm and 50,000 ppm based on said fluorine-containing sulfonic acid.

6. The ion conductive film according to claim 1, wherein said nitrogen-containing compound is guanidinobenzimidazole.

7. The ion conductive film according to claim 6, wherein said ion conductive polymer is a fluorine-containing sulfonic acid.

8. The ion conductive film according to claim 7, wherein the amount of said nitrogen-containing compound falls within a range of between 1 ppm and 50,000 ppm based on said fluorine-containing sulfonic acid.

9. The ion conductive film according to claim 1, wherein said nitrogen-containing compound is diaminopurine.

10. The ion conductive film according to claim 9, wherein said ion conductive polymer is a fluorine-containing sulfonic acid.

11. The ion conductive film according to claim 10, wherein the amount of said nitrogen-containing compound falls within a range of between 1 ppm and 50,000 ppm based on said fluorine-containing sulfonic acid.

12. The ion conductive film according to claim 3, wherein said ion conductive polymer is a fluorine-containing sulfonic acid.

13. The ion conductive film according to claim 12, wherein the amount of said nitrogen-containing compound falls within a range of between 1 ppm and 50,000 ppm based on said fluorine-containing sulfonic acid.

14. The ion conductive film according to claim 1, wherein the nitrogen-containing compound is immobilized to the ion conductive polymer by an ionic bond.

15. The ion conductive film according to claim 8, wherein the nitrogen-containing compound is immobilized to the ion conductive polymer by an ionic bond.

16. The ion conductive film according to claim 11, wherein the nitrogen-containing compound is immobilized to the ion conductive polymer by an ionic bond.

17. The ion conductive film according to claim 13, wherein the nitrogen-containing compound is immobilized to the ion conductive polymer by an ionic bond.

18. The ion conductive film according to claim 1, wherein the ion conductive film has a thickness of from 0.01 μm to 10 μm.

* * * * *